Oct. 21, 1958

C. F. DASSANCE 2,856,797

VARIABLE SPEED GEARED PULLEY

Filed June 1, 1953

INVENTOR.
Carroll F. Dassance.
BY
Harness, Dickey & Pierce
ATTORNEYS.

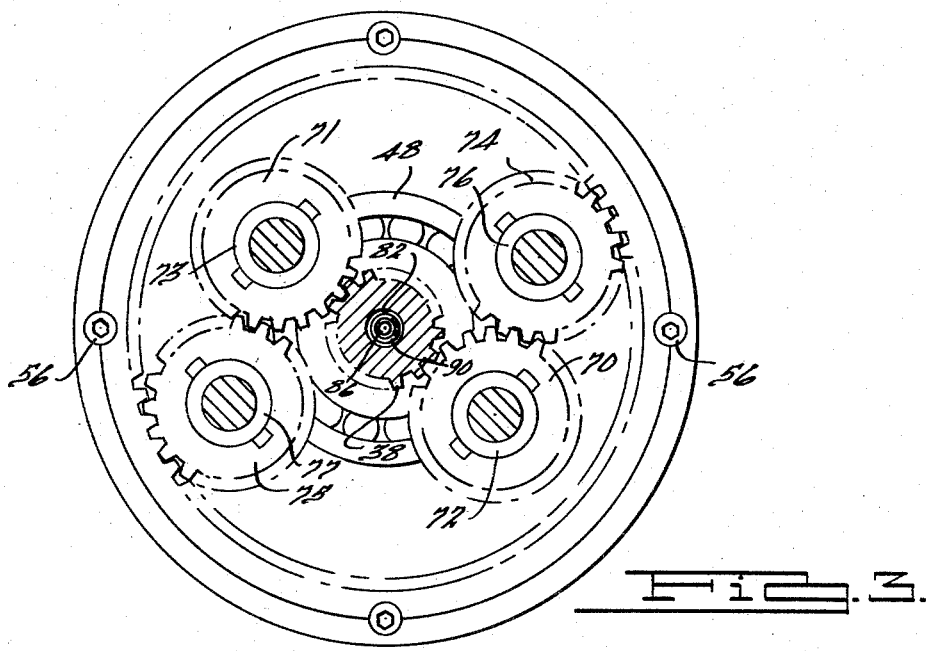
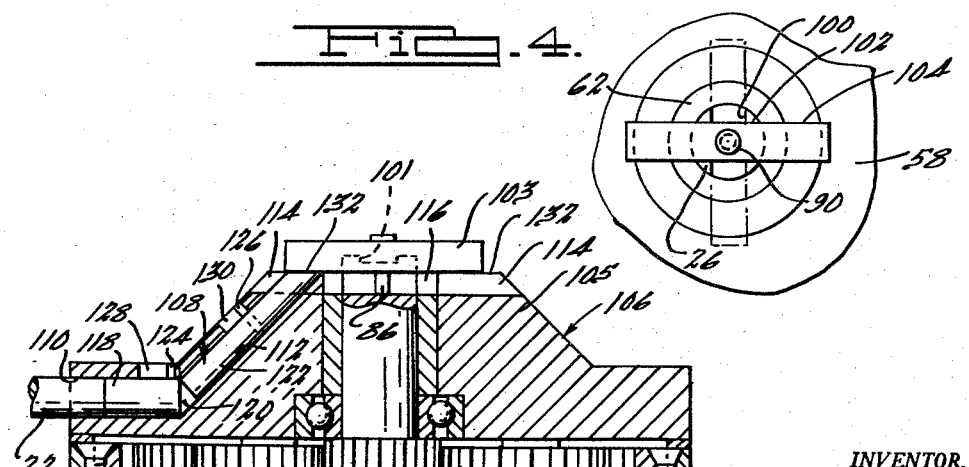

United States Patent Office 2,856,797
Patented Oct. 21, 1958

2,856,797

VARIABLE SPEED GEARED PULLEY

Carroll F. Dassance, St. Clair Shores, Mich.

Application June 1, 1953, Serial No. 358,920

2 Claims. (Cl. 74—789)

This invention relates to variable speed geared pulleys, and, more particularly, to a step cone pulley embodying a novel and efficient planetary gear reduction drive adapted to increase the speed reduction range of said pulley.

In recent years, the use of a step cone pulley to provide a greater range of drive speeds and powers on light-type machinery, such as a light-type drill press or the like, has increased considerably. Many step cone pulley constructions have been designed employing various types of gear drives for increasing the number of speed reductions. However, none of the step cone pulleys available at the present time provide an efficient and durable construction which will stand up under a rigorous and continuous production schedule.

Accordingly, it is an object of this invention to provide an improved, step cone pulley having a novel planetary gear reduction drive adapted for use on light-type machinery, such as a light-type drill press or the like, to provide greater power and reduced speeds that formerly could only be obtained on heavier, more expensive machinery.

It is another object of this invention to provide a variable speed planetary gear pulley embodying a rugged planetary gear reduction drive which is simple and compact in construction, positive in operation, and economical to manufcture.

It is a further object of this invention to provide a variable speed geared pulley embodying a fully enclosed planetary gear driven speed reducer adapted for quick installation and to provide long, trouble-free service.

It is a further object of this invention to provide a variable speed geared pulley having a novel planetary gear reduction drive provided with an improved means for locking the gear train, to permit a direct drive of the pulley from the driving motor, in a manner which reduces the load on the sun gear with a resultant lower wear on said gear.

Other objects and features of novelty of the invention will be specifically pointed out or will become apparent when referring, for better understanding of the invention, to the following description taken in conjunction with the accompanying drawings, wherein:

Fig. 3 is a sectional view of the structure illustrated in Fig. 2, taken on the line 3—3 thereof;

Fig. 4 is a fragmentary plan view of the illustrative embodiment of Fig. 1, as viewed on the line 4—4, showing the engaged and disengaged positions of the locking key; and Fig. 5 is a view of structure, similar to that illustrated in Fig. 2, showing another form thereof.

Figure 1:
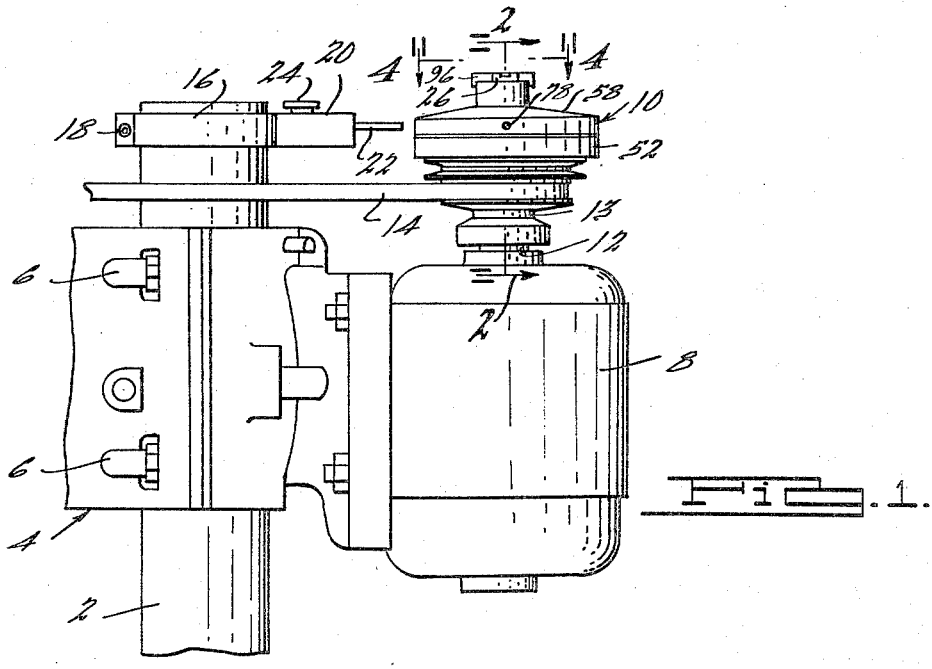
Fig. 1 is a fragmentary elevational view of a standard for a machine, such as a drill press, or the like, supporting a motor and a variable speed geared pulley made in accordance with the principles of the invention.

Referring now to the drawings, in Fig. 1 is shown a fragmentary portion of a machine such as a drill press on which a variable speed geared pulley, made in accordance with the principles of the present invention, is illustrated. The machine structure of Fig. 1 includes a standard 2 having adjustably mounted on the upper end thereof a supporting collar 4 fixedly secured thereto by means of clamping elements 6. Rigidly mounted on one side of the supporting collar 4 is a motor 8 having a variable speed geared pulley 10 operatively connected to the motor output shaft 12. The variable speed geared pulley 10 is provided with three aligned cones 13 in one of which is seated a driving belt 14 for driving a machine element such as the spindle of a drill press or the drive shaft of some other machine. Mounted on the upper end of the standard 2 is a clamping collar 16 fixedly secured to said standard by a locking element 18 and having an integral boss 20 carrying a rod 22 which may be locked in adjusted positions by the knob handle 24. The function of the rod 22 will be described hereinafter.

Figure 2:
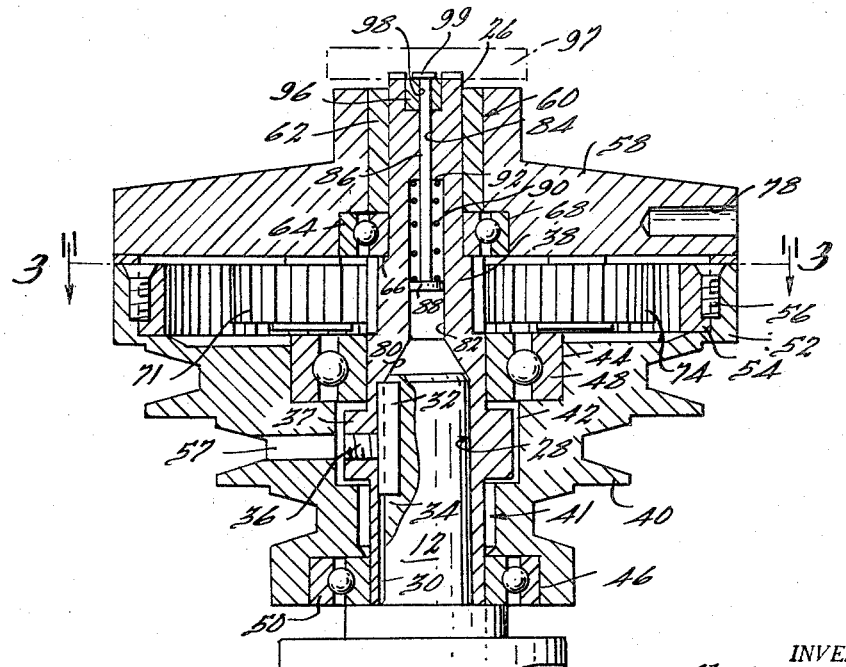
Fig. 2 is an enlarged, vertical, sectional view of the structure illustrated in Fig. 1, taken on the line 2—2 thereof.

As is best seen in Figs. 2, 3 and 4, the variable speed geared pulley 10 comprises, a driving shaft 26 provided with a stepped axial bore 28 containing a key slot 30 by which the shaft is locked against rotation by a key 32 to the motor drive shaft 12. The two shafts are fixedly held in place by a set screw 36 which is threadably mounted in an outwardly extending shoulder 37 of the driving shaft 26 in position to engage the key 32. The stepped cone pulley 40 has a stepped axial bore 41 which is enlarged at 42 to receive the shoulder 37 of the driving shaft 26. The axial bore 41 is enlarged at the ends as at 44 and 46 to receive the bearing assemblies 48 and 50. The outer periphery of the pulley 40 is provided with a plurality of V-shaped grooves of different diameters designed to carry a V-shaped drive belt for the production and transmission of different speeds by the pulley 10. Integrally attached on the upper peripheral edge of the pulley 40 is an upwardly extending flange portion 52 forming a recess in which an internal ring gear 54 is secured by a plurality of set screws 56. An aperture 57 extends through the wall of the pulley in alignment with the set screw 36 which may be tightened or loosened by a tool inserted through the aperture.

A carrier member or disc 58 having an axial bore 60 in which is mounted a press fitted bushing 62 is rotatably mounted on the upper end of the driving shaft 26 on a bearing assembly 64. The driving shaft 26 is provided with a shoulder 66 which coacts with an enlarged portion 68 of the carrier disc bore 60 to provide a seat for the bearing assembly 64. The carrier disc 58 has rotatably mounted on the lower face thereof a first pair of planet gears 70, 71 mounted on pins 72, 73, respectively. The planet gears 70, 71 are diametrically disposed so as to have the teeth thereon mesh with the teeth of the sun gear 38 which is integrally mounted on the driving shaft 26. Rotatably mounted on the lower face of the carrier disc 58 is a second pair of planet gears 74, 75 mounted on pins 76, 77 respectively. The planet gears 74, 75 are also diametrically disposed but on a larger radius than the planet gears 70, 71, so as to mesh with the planet gears 70, 71 and with the internal ring gear 54. The pins 72, 73, 76 and 77 may be mounted in the lower face of the carrier disc 58 in any suitable manner as by a press fit, a screw thread connection, or the like. The carrier disc 58 is provided with a horizontal aperture 78 cut into one side thereof, as by drilling, which functions to slidably receive the aforementioned rod 22 so as to hold the carrier disc 58 against rotation and thereby provide for a speed reducing action by the planetary gear train comprising the sun gear 38, internal ring gear 54, and planet gears 70, 71, 74 and 75.

The bore 28 of the driving shaft 26 extends upwardly and is tapered down as at 80 to a smaller diameter bore as at 82. Extending upwardly through the shaft 26 from the smaller bore 82 is a reduced bore 84 in which is slidably mounted a rod-like member 86 having a flange 88 integrally provided on the lower end thereof. A compression spring 90 is mounted in the bore 82 encircling the member 86 and abutting the upper surface of the flange 88 and the upper shoulder 92 of the bore 82. A rectangular shaped locking key 96 having a centrally located aperture 98 is mounted on the upper end of the rod-like member 86 and held thereon by means of an integrally formed head portion 99 on the upper end of member 86. The upper end of the driving shaft 26 is provided with a shallow transverse slot 100 and a deep transverse slot 102, said slots being at right angles to each other and adapted to receive the locking key 96. As is best seen in Fig. 2, when the key member 96 is seated in the transverse slot 100, it is at a level above the upper edge of the carrier disc 58, but when the key 96 is positioned in the transverse slot 102, it is below the upper edge of the carrier disc 58 and engages the carrier disc 58 by means of the mating transverse slot 104 which is located in the upper edge of the carrier disc.

A modified carried disc 106 is shown in Fig. 5 embodying a safety interlock generally designated as 108 which is designed to prevent the locking key 103 from being accidentally moved from the disengaged position in transverse slot 101 to the engaged or locked position in transverse slot 116 before the rod 22, which holds the carrier disc 106 against rotation, has been released from the aperture or bore 110.

The carrier disc 106 is similar to the carrier disc 58 but has a built up shoulder 105 in which is provided a horizontal bore 110 aligned to terminate at the lower end of a slanting bore 112 which extends upwardly to the transverse slot 114 located on the upper edge of the carrier disc 106. The slot 114 corresponds to the slot 104 in disc 58. Slidably mounted in the bore 110 is a pin 118 having a formed head 120 adapted to abut against the lower end of another pin 122 which is slidably mounted in the bore 112. The pins 118, 122 are limited in travel and rotation by means of the keys 124, 126 and the slots 128 and 130 respectively. The upper end of the pin 122 is provided with a horizontal surface 132. As is best seen in Fig. 5, when the stop member 22 engages the bore 110, to hold the carrier disc 106 against rotation, the pin 118 will be moved inwardly and engage the lower end of the slanting pin 122 which will be projected upwardly into the transverse slot 114. It will be apparent that when the pin 122 is moved up into the slot 114, the upper edge 132 of said pin will be level with the upper edge 132 of the carrier disc 106. When this condition exists, the locking key 103 will be prevented from accidentally being moved into the transverse slot 114.

When the stop member 22 is withdrawn from the bore 110, the compression spring 90 acting through the rod member 86 and the locking key 103 will function to move the slanted pin 122 downwardly and out of the transverse slot 114 to allow the locking key 103 to engage the transverse slot 114.

When the locking key 96 is engaged in the transverse slots 102 and 104, as illustrated in Figs. 2 and 4, actuation of the driving shaft 26 by the motor 8 rotates the entire pulley assembly relative to the stop member 22, that is, the sun gear 38 is locked to the carrier disc 58 which prevents the planet gears 70, 71, 74, 75 from rotating relative to the sun gear, thereby preventing rotation between the planet gears and the internal ring gear 54 and setting up a unit driving relationship. It will be appreciated that when the planetary gear train is locked, as above described, the power is transmitted from the driving shaft 26 to the pulley 40 by two paths. A portion of the power is transmitted through a first path, namely, from the driving shaft 26 through the locking key 96 into the carrier disc 58, through the pins 76 and 77 to the planet gears 74 and 75 and thence to the internal ring gear 54 and pulley 40. The rest of the power is transmitted through a second path, namely, from the driving shaft 26 through the sun gear 38 to the planet gears 70 and 71, to the planet gears 74, 75 and thence to the internal ring gear 54 and pulley 40. It will be seen that a novel double power path exists when the gear train is locked for unit driving relationship, the separate portions starting at the driving shaft 26 and joining at the outer planet gears 74 and 75. One advantage of this dual power path is that the pressure on the teeth of the sun gear 38 is considerably reduced during the unit driving relationship, thus increasing the life of said gear.

When the locking pin 96 is moved upwardly into the transverse slot 100, as illustrated in Fig. 2, by the numeral 97, the carrier disk 58 is then locked to the standard 2 by means of the stop member 22 engaging the bore 78. The rotation of the driving shaft 26 produces a corresponding rotation of the sun gear 38 which drives the first pair of planet gears 70, 71, said first pair of planet gears then drive the second pair of planet gears 74, 75, and the second pair of planet gears then drive the internal ring gear 54 at a reduced speed to thereby cause the rotation of the pulley body 40 at a reduced speed proportionate to the ratio of teeth of the sun gear 38 with the teeth of the internal ring gear 54 and in the same direction as when the gears are locked against rotation. It will be appreciated that any desired speed ratio may be obtained by selecting the proper number of teeth for the sun gear 38 and the internal ring gear 54.

While it will be apparent that the preferred embodiments of the invention herein disclosed are well calculated to fullfill the objects and features above stated, it will be appreciated that the invention is susceptible to modification, variation and change without departing from the proper scope of fair meaning of the subjoined claims.

What is claimed is:

1. In a variable speed geared pulley construction having a pulley body member having a ring gear, a shaft member having a sun gear and a carrier member rotatably mounted on said shaft member and having said ring and sun gears interconnected by a plurality of gears pivoted on said carrier member in meshed relation to each other, a transverse slot in said carrier member, a first transverse slot in said shaft member and adapted to be aligned with the transverse slot in said carrier member, a second transverse slot in said shaft member, a locking key resiliently mounted on said shaft member and adapted to engage said slots whereby when said locking key engages said carrier member transverse slot and said first transverse slot, said shaft and carrier members will be interlocked and said gears will rotate as a unit, and when said key engages said second transverse slot said gears may be driven to provide a speed reduction for said pulley body member.

2. In a variable speed geared pulley construction having a pulley body member having a ring gear, a shaft member having a sun gear and a carrier member rotatably mounted on said shaft member and having said ring and sun gears interconnected by a plurality of gears pivoted on said carrier member in meshed relation to each other, a transverse slot in said carrier member, a first transverse slot in said shaft member and adapted to be aligned with the transverse slot in said carrier member, a second transverse slot in said shaft member, a locking key resiliently mounted on said shaft member and adapted to engage said slots whereby when said locking key engages said carrier member transverse slot and said first transverse slot, said shaft and carrier members will be interlocked and said gears will rotate as a unit, and when said key engages said second transverse slot said gears may be driven to provide a speed reduction for said pulley body member, and an interlock means on said carrier member adapted to be projected into said carrier member transverse slot to prevent said locking key from being accidentally moved from said second transverse slot into said first transverse slot while said gears are driven.

References Cited in the file of this patent

UNITED STATES PATENTS

| | | |
|---|---|---|
| 800,268 | Conradson | Sept. 26, 1905 |
| 980,948 | Herring | Jan. 10, 1911 |
| 1,081,763 | Meyers | Dec. 16, 1913 |
| 1,083,863 | Shortman | Jan. 6, 1914 |
| 1,436,817 | Ovren | Nov. 28, 1922 |
| 2,087,261 | Miller | July 20, 1937 |
| 2,296,573 | Richards | Sept. 22, 1942 |
| 2,349,332 | Angell | May 23, 1944 |
| 2,477,024 | Webster | July 26, 1949 |
| 2,602,600 | Kappeler | July 8, 1952 |
| 2,667,048 | Whitfield | Jan. 26, 1954 |